United States Patent [19]

May, Jr. et al.

[11] 3,974,333

[45] Aug. 10, 1976

[54] ADAPTIVE SYNCHRONIZATION SYSTEM

[75] Inventors: Carl Jerome May, Jr., Holmdel; Victor Basil Sorin, Matawan, both of N.J.

[73] Assignee: Bell Telephone Laboratories, Incorporated, Murray Hill, N.J.

[22] Filed: Sept. 24, 1975

[21] Appl. No.: 616,285

[52] U.S. Cl. .......................... 178/69.5 R; 328/155
[51] Int. Cl.² ........................................ H04L 7/00
[58] Field of Search ................ 178/53, 69.5 R; 179/15 BS; 328/55, 133, 155; 331/1 R, 1 A

[56] References Cited
UNITED STATES PATENTS

| | | | |
|---|---|---|---|
| 3,024,417 | 3/1962 | Secretan | 178/69.5 R |
| 3,208,050 | 9/1965 | Bird et al. | 178/69.5 R |
| 3,401,353 | 9/1968 | Hughes | 333/11 |
| 3,628,169 | 12/1971 | Chur | 333/1 |
| 3,825,683 | 7/1974 | Pitroda et al. | 178/69.5 R |

Primary Examiner—Benedict V. Safourek
Attorney, Agent, or Firm—Stephen M. Gurey; John K. Mullarney

[57] ABSTRACT

Active and standby clock signals are phase synchronized to each other within a predetermined phase tolerance by synchronizing each clock signal to the same reference pulse stream. A first synchronizing pulse signal is derived from the active clock signal and a second synchronizing pulse signal is derived from the standby clock signal. For each synchronizing pulse signal, the pulse widths exceed the reference signal pulse widths by an amount related to the predetermined phase tolerance. Synchronization between the active and standby clock signals is achieved when the phases of the active and standby clock signals are adjusted such that the pulse widths of the reference pulses lie entirely within the time domain of the pulse widths of the synchronizing pulse signals.

9 Claims, 20 Drawing Figures

SYNCHRONIZING CIRCUIT

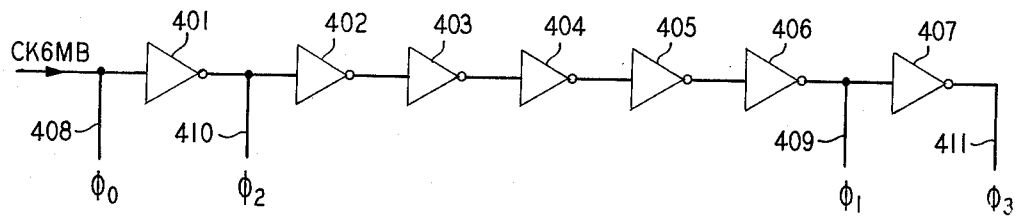
FIG. 4A
PHASE SELECT
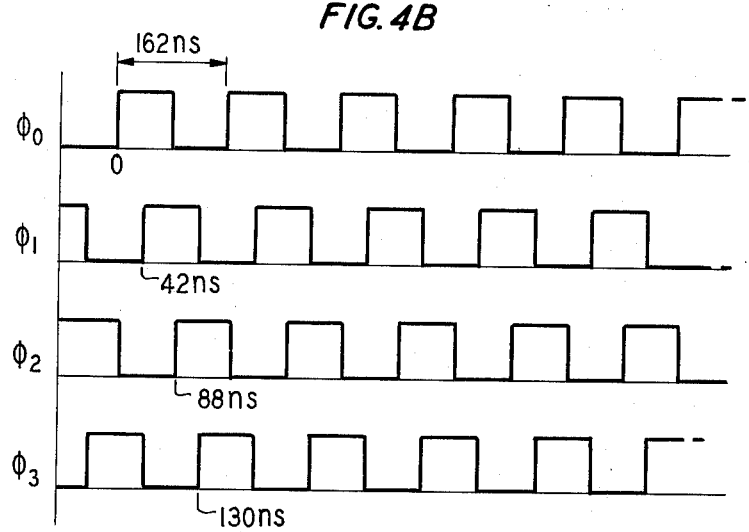
FIG. 4B
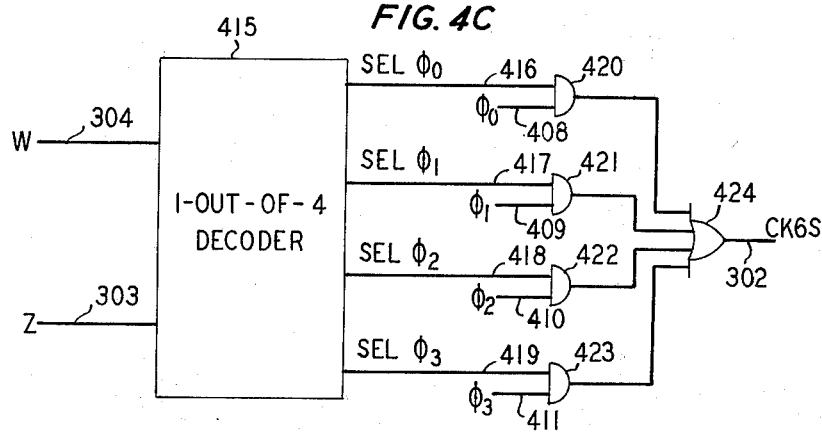
FIG. 4C
FIG. 4D
| W | Z | SEL |
|---|---|-----|
| 0 | 0 | $\phi_0$ |
| 1 | 0 | $\phi_1$ |
| 1 | 1 | $\phi_2$ |
| 0 | 1 | $\phi_3$ |

FIG. 5A
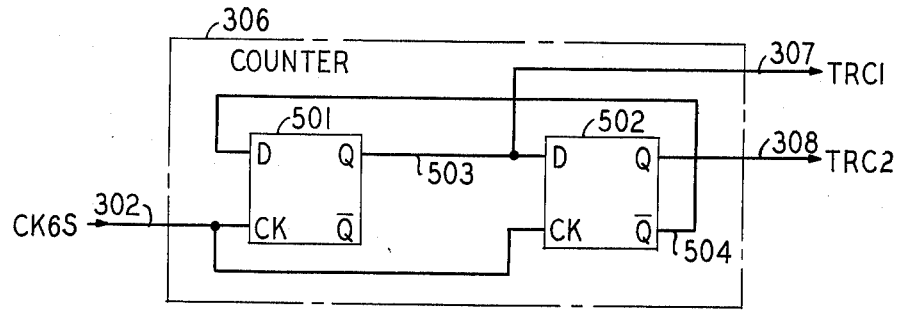
FIG. 5B
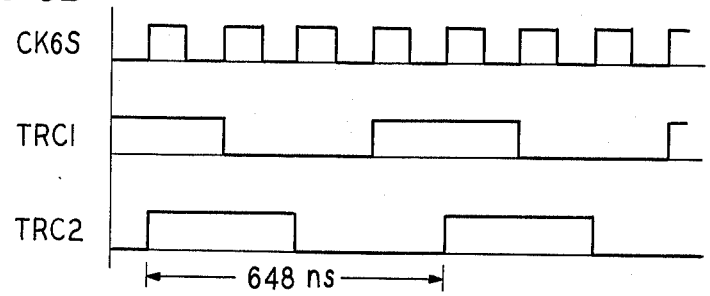
FIG. 6A
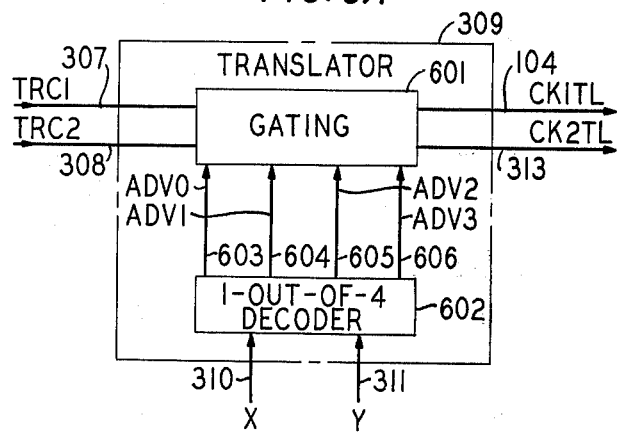
FIG. 6D
| X | Y | ADV |
|---|---|-----|
| 0 | 1 | 0 |
| 0 | 0 | 1 |
| 1 | 0 | 2 |
| 1 | 1 | 3 |
FIG. 6B
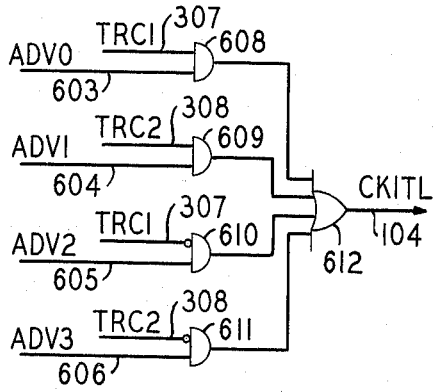
FIG. 6C
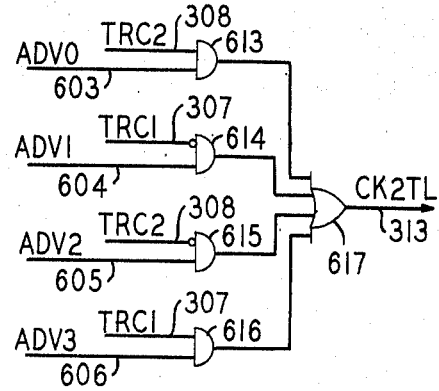

SYNC DETECTOR

SYNC CONTROL

| STATE | X | Y | W | Z |
|---|---|---|---|---|
| 1 | 0 | 1 | 0 | 0 |
| 2 | 0 | 0 | 0 | 0 |
| 3 | 1 | 0 | 0 | 0 |
| 4 | 1 | 1 | 0 | 0 |
| 5 | 0 | 1 | 1 | 0 |
| 6 | 0 | 0 | 1 | 0 |
| 7 | 1 | 0 | 1 | 0 |
| 8 | 1 | 1 | 1 | 0 |
| 9 | 0 | 1 | 1 | 1 |
| 10 | 0 | 0 | 1 | 1 |
| 11 | 1 | 0 | 1 | 1 |
| 12 | 1 | 1 | 1 | 1 |
| 13 | 0 | 1 | 0 | 1 |
| 14 | 0 | 0 | 0 | 1 |
| 15 | 1 | 0 | 0 | 1 |
| 16 | 1 | 1 | 0 | 1 |

ADAPTIVE SYNCHRONIZATION SYSTEM

BACKGROUND OF THE INVENTION

This invention relates to the phase synchronization of clock pulse signals.

To insure against the complete failure of a digital communication system in the event of the failure of the timing system, duplicated clock pulse signals are often independently generated as a clock maintenance strategy. In the event of a failure of one clock pulse source a standby clock can be switched onto the network to maintain network operation. Problems can arise, however, when during network operation the ability of the standby clock to be switched onto the network in place of the active clock is periodically tested. In particular, the standby clock pulse signal, although frequency locked to the active on-line clock signal, may lack phase synchronization with the active clock signal. When an out-of-phase standby clock is test-switched onto a digital network, an out-of-frame condition may result at the distant end of the digital system resulting in a loss of data. In order to prevent a possible out-of-frame condition each time the standby clock is test-switched onto the network, the standby and active clock signals should be phase synchronized within a predetermined tolerance.

SUMMARY OF THE INVENTION

It is the primary object of the present invention to phase synchronize two clock pulse signals within an exacting predetermined tolerance.

In accordance with the present invention, active and standby clock pulse signals are phase synchronized to each other within a predetermined tolerance by synchronizing each clock signal to the same reference pulse stream, wherein the frequency of the active and standby clock signals is a multiple of the frequency of the reference signal. In particular, novel synchronizing circuits, one each being associated with the active and standby clocks, are employed to phase synchronize each clock signal to the reference pulse stream. Each synchronizing circuit derives from the associated clock signal a synchronizing pulse signal having a frequency equal to the frequency of the clock signal and pulse widths determined in part by the desired tolerance. In addition, the leading edge of each synchronizing pulse is coincident with the leading edge of the clock signal from which it is derived. In accordance with the present invention the phase synchronization between the clock signals and the reference pulse stream is achieved when the pulse width of each reference clock pulse lies entirely within the time domain of a pulse width of the derived synchronizing signal. Each synchronizing circuit adjusts the phase of its associated clock signal and thus also the phase of the derived synchronizing pulse signal until the desired nesting between the reference pulses and the synchronizing pulses is achieved. Since the reference pulses are nested (lie) within the time domain of the pulses of the synchronizing signals associated with both the active and standby clock signals, the phase difference between these synchronizing signals is less than the difference between a synchronizing signal pulse width and the reference signal pulse width. In addition, since the leading edges of the pulses in the active and standby clocks are coincident with the leading edges of the corresponding synchronizing signals, the phase difference between the active and standby clock signals will also be within the same time difference. Accordingly, the selection of the pulse widths of the synchronizing signals relative to the pulse widths of the reference signals is determinative of the phase tolerance between the synchronized active and standby clock signals.

It is a feature of the sychronizing system of the present invention that it is adaptive to phase shifts in the active and standby clocks due to component aging and other factors.

BRIEF DESCRIPTION OF THE DRAWINGS

FIGS. 4A and 4C illustrate an embodiment of a phase select network employed in the synchronizing circuit of FIG. 3;

FIG. 4B is a timing diagram illustrating the output signals of FIG. 4A;

FIG. 4D is a logic table useful in explaining the operation of FIG. 4C;

FIG. 5A is an embodiment of a counter employed in FIG. 3;

FIG. 5B illustrates the timing relationship between the input and output signals of FIG. 5A;

FIGS. 6A, 6B and 6C illustrate an embodiment of the translator network employed in FIG. 3;

FIG. 6D is a logic table useful in explaining the operation of FIGS. 6A, 6B and 6C;

DETAILED DESCRIPTION

In the embodiment of the present invention to be described hereinafter an active and a standby source of clock pulses each having a frequency of 1.544 megabits per second are phase locked within a predetermined and exacting tolerance. In particular, if the active and standby clock pulse streams are phase locked within one-fourth of a pulse width (< 162 nanoseconds), a transition from the active to the standby clock will not cause a disturbance in the digital transmission system.

Figure 1:
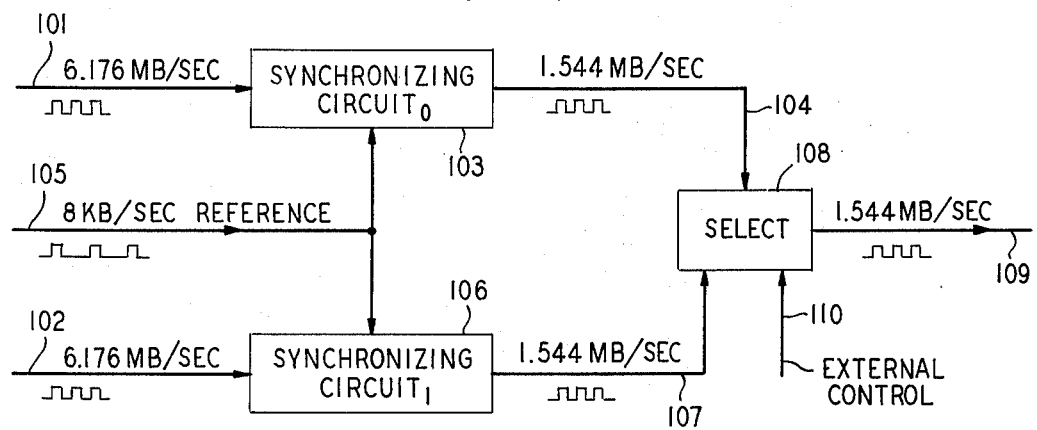
FIG. 1 illustrates an active and standby clock system employing the synchronizing circuits of the present invention.

With reference to FIG. 1, a first 6.176 megabits per second clock pulse stream having a 50 percent duty cycle and 162 nanosecond period is present on lead 101 and a second 6.176 megabits per second clock pulse signal also having a similar 50 percent duty cycle is present on lead 102. Although each of these 6.176 megabits per second clock pulse streams may be derived from a common higher frequency digital source, filtering will likely cause a phase difference between the pulse streams. The active and standby 1.544 megabits per second clock pulse streams are derived from the 6.176 megabits per second pulse streams on leads 101 and 102, respectively, by dividing the frequency of the input pulse streams by four. As aforenoted, the 1.544 megabits per second clock pulse streams are phase locked within 162 nanoseconds so that the standby clock pulse stream can be switched onto the outgoing line without causing an out-of-frame condition at the distant end.

In accordance with the principles of the present invention, a synchronizing circuit 103 generates the active 1.544 megabits per second clock pulse stream on lead 104. As will be described in detail hereinafter, the active 1.544 megabits per second clock pulse stream is phas synchronized to an 8 kilobits per second reference pulse stream applied to synchronizing circuit 103 via lead 105, each reference pulse being 61 nanoseconds wide. A synchronizing circuit 106 similarly derives the standby 1.544 megabits per second clock pulse stream on lead 107 from the 6.176 megabits per second pulse stream on lead 102. Synchronizing circuit 106 phase locks this standby 1.544 megabits per second clock pulse stream to the same 8 kilobits per second reference pulse stream on lead 105. As is described in detail hereinbelow, the 1.544 megabits per second clock pulse streams on leads 104 and 107 are phase locked to the 8 kilobits per second reference pulse stream on lead 105 and thus each 1.544 megabits per second pulse stream can be phase synchronized with each other within a predetermined tolerance. Accordingly, a select network 108, in response to an external control signal on lead 110, can switch either the active clock pulse stream on lead 104 or the standby clock pulse stream on lead 107 to output lead 109 with a minimum discontinuity.

As will be described in detail hereinafter, each synchronizing circuit derives from the applied 6.176 megabits per second pulse stream both a 1.544 megabits per second clock pulse stream having a 50 percent duty cycle and a 1.544 megabits per second synchronizing signal in which each pulse is 162 nanoseconds wide. The leading edge of each pulse in the 1.544 megabits per second synchronizing signal is coincident with the leading edge of each pulse in the 1.544 megabits per second clock pulse stream. Accordingly, when the leading edges of the pulses of the synchronizing signals derived by synchronizing circuits 103 and 106 are within the desired phase tolerance, the 1.544 megabits per second clock signals on leads 104 and 107 are also within the desired phase tolerance.

Figure 2:
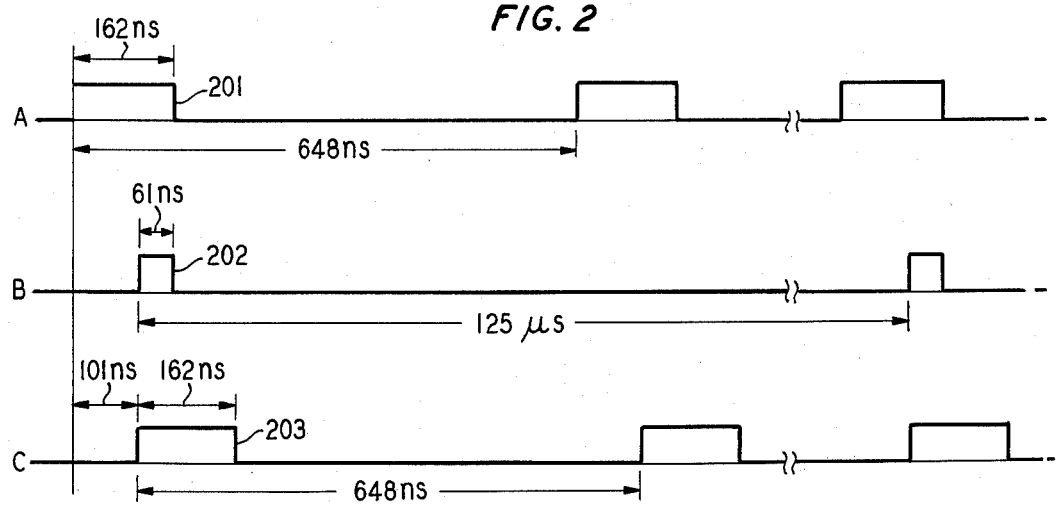
FIG. 2 is a timing diagram useful in explaining the nesting technique between the synchronizing signals and the reference pulses.

With reference to FIG. 2, pulse stream A illustrates the 1.544 megabits per second synchronizing signal derived by synchronizing circuit 103 and pulse stream C illustrates the 1.544 megabits per second synchronizing signal derived by synchronizing circuit 106. Pulse stream B illustrates the 8 kilobits per second reference pulse stream on lead 105. In accordance with the principles of the present invention and, as will be described in detail hereinafter, synchronizing circuits 103 and 106 each independently adjust the phases of the 1.544 megabits per second clock pulse streams on leads 104 and 107, and thus also the derived synchronizing signals, until the 61 nanosecond reference pulse is entirely nested within the time domain of the 162 nanosecond pulse widths of the synchronizing signals. When the phases of the active and standby clock pulse streams are so adjusted, the maximum phase difference between the active and standby clock pulse streams is 101 nanoseconds which is within the maximum allowable phase tolerance. As can be noted in FIG. 2, this maximum phase difference is present when the trailing edge of the reference pulse is coincident with the trailing edge of a 162 nanosecond pulse in one synchronizing signal while the leading edge of the reference pulse is simultaneously coincident with the leading edge of a 162 nanosecond pulse in the other synchronizing signal. Inasmuch as 1.544 megabits per second is the 193rd multiple of 8 kilobits per second, each subsequent 61 nanosecond reference pulse is similarly nested within the time domain of the pulses in the synchronizing signals once phase-lock is achieved. As detailed hereinafter, if any portion of the reference pulse falls without the time domain of the 162 nanosecond pulse widths, the phase of the unnested synchronizing signal is adjusted. The phases of the active and standby clocks are therefore continually adjusted to maintain the desired nesting condition and thus phase lock.

Nesting between the derived 1.544 megabits per second synchronizing signal and the 8 kilobits per second reference signal is obtained by a series of coarse and fine phase shifts of both the 6.176 megabits per second pulse stream and the 1.544 megabits per second clock pulse stream. Inasmuch as the synchronizing circuits 103 and 106 in FIG. 1 operate in an identical manner and are identical networks, only synchronizing circuit 103 will be described in detail hereinbelow. Network elements that appear in a plurality of figures are consistently referred to with the same numerical designation.

Figure 3:
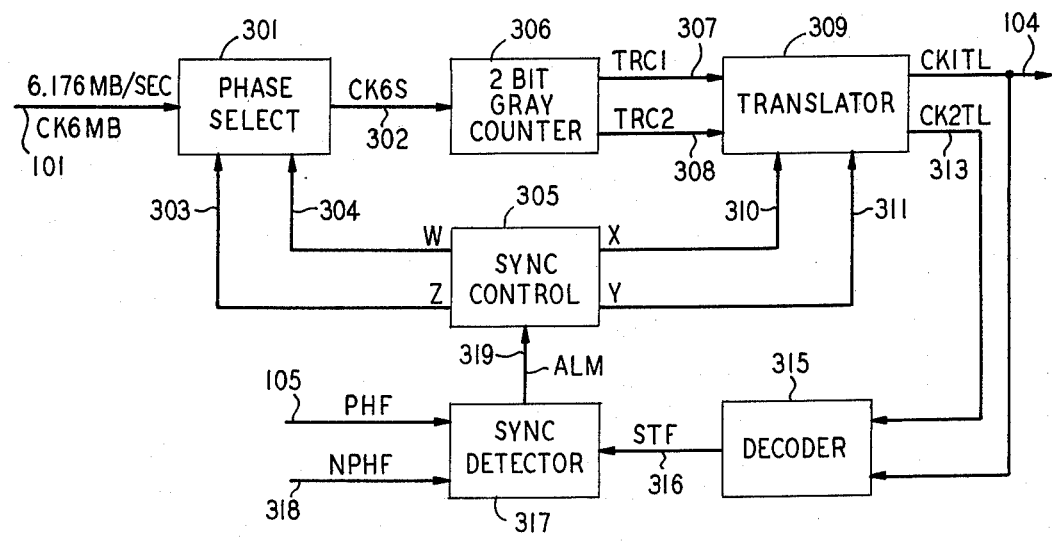
FIG. 3 is an embodiment of a synchronizing circuit in accordance with the present invention.

Synchronization circuit 103 is illustrated in FIG. 3. Input lead 101 is connected to a phase select network 301. The output signal CK6S of the phase select network, on lead 302, is a 6.176 megabits per second clock signal which is either in phase and equivalent to the CK6MB input signal or delayed therefrom by approximately one-fourth, one-half or three-fourths of the 162 nanosecond period. Phase select network 301 selects which of these 6.176 megabits per second clock signals is outputted onto lead 302 in response to the states W and Z of leads 304 and 303, respectively.

Phase select network 301 is illustrated in FIGS. 4A and 4C. With reference to FIG. 4A, the signal CK6MB is passed through a string of seven inverter gates, 401–407, chosen such that each gate has an inherent delay of approximately 7 nanoseconds. By tapping the string of gates at selected points, three signals phase shifted from signal CK6MB are derived. FIG. 4B illustrates the four clock signals, $\phi_0$, $\phi_1$, $\phi_2$, and $\phi_3$, available to be outputted onto lead 302. The unshifted clock signal $\phi_0$ appears at the input to gate 401 on lead 408. By tapping the sixth gate 406 onto lead 409, a clock signal $\phi_1$ is derived which is delayed from $\phi_0$ by approximately 42 nanoseconds, or equivalently, approximately one-fourth period. The second phase shifted signal $\phi_2$ delayed by approximately 88 nanoseconds (approximately one-half period) from $\phi_0$ is derived by tapping the output of gate 401 onto lead 410; note, the inversion provided by inverter 401 contributes approximately 81 nanoseconds of delay. The third phase shifted signal $\phi_3$ delayed from $\phi_0$ by approximately 130 nanoseconds (approximately three-fourths period) is derived by tapping the output of gate 407 onto lead 411; note, inverter 407 adds an additional 88 nanosecond delay to the signal $\phi_1$ at its input.

As aforenoted, phase select network 301 selects the signal, $\phi_0$, $\phi_1$, $\phi_2$ or $\phi_3$, to be outputted onto lead 302 in response to the states W and Z of leads 304 and 303, respectively, the gating network used to output the proper 6.176 megabits per second signal onto lead 302 is illustrated in FIG. 4C. Leads 304 and 303 are connected to a one-out-of-four decoder 415 having four output leads 416–419. An output lead of decoder 415 is energized in response to each possible code combination of the states W and Z of leads 304 and 303. FIG. 4D illustrates the translation table between the W and Z states and the output of decoder 415. When W and Z are deenergized, as indicated in table 4D by the designation "00," lead 416 is energized, indicated in FIG. 4D as "SEL $\phi_0$". Similarly, when W and Z are both energized, output lead 418 (SEL $\phi_2$) of decoder 415 is energized.

Leads 416–419 are connected to first inputs of AND gates 420–423, respectively, and the $\phi$ signals derived by the network in FIG. 4A are applied to second inputs of AND gates 420–423. Accordingly, lead 408 is connected to a second input of AND gate 420, lead 409 is connected to a second input of AND gate 421, lead 410 is connected to a second input of AND gate 422, and lead 411 is connected to a second input of AND gate 423. The outputs of AND gates 420–423 are each connected to inputs of an OR gate 424. The output of OR gate 424 is the output of phase select network 301, designated in FIG. 3 as lead 302. In response to each WZ code combination, therefore, one output lead of decoder 415 is energized and one $\phi$ signal is gated through OR gate 424 to output lead 302. Accordingly, as the WZ code is varied, in a manner to be described in detail hereinafter, the phase of the 6.176 megabits per second signal CK6S on lead 302 is shifted in discrete steps of approximately 40 nanoseconds.

With reference again to FIG. 3, signal CK6S on lead 302 is applied to a 2-bit Gray counter 306. The 2-bit Gray counter 306 divides the frequency of signal CK6S by four to generate two 1.544 megabits per second clock pulse signals (period equal to 648 nanoseconds) TRC1 and TRC2 on leads 307 and 308, respectively, wherein the phase shift between TRC1 and TRC2 is one-quarter period (162 nanoseconds).

The 2-bit Gray counter 306 is illustrated in FIG. 5A. The input and output clock signals, CK6S and TRC1 and TRC2, respectively, are illustrated in FIG. 5B. With reference to FIG. 5A, lead 302 is connected to the clock CK inputs of positive edge triggered D-type flip-flops 501 and 502. The high Q output 503 of flip-flop 501 is connected to the D input of flip-flop 502. The low $\overline{Q}$ output 504 of flip-flop 502 is connected to the D input of flip-flop 501. Output lead 307 of counter 306 is connected to lead 503 and output lead 308 is connected to the high Q output of flip-flop 502. Flip-flops 501 and 502 operate in a manner well known in the art. Accordingly, the state of each flip-flop is determined by the signal at the D input upon the occurrence of a clock pulse leading edge at the clock CK input.

If it is assumed, for illustrative purposes, that flip-flop 501 is initially ON and flip-flop 502 is initially OFF such that lead 307 is energized and lead 308 is deenergized, the signals generated on output leads 307 and 308 in response to signal CK6S can be appreciated with reference to FIG. 5B. Since flip-flop 502 is assumed OFF, lead 504 is initially energized. Therefore, at the leading edge of the initial clock pulse on lead 302, the D input of flip-flop 501 is energized and flip-flop 501 remains ON, thus maintaining lead 307 in an energized state. Since it had been assumed that lead 503 was initially energized, the first clock pulse on the clock input of flip-flop 502 causes that flip-flop to switch ON and thereby energize output lead 308 and deenergize lead 504. With lead 504 and thus the D input of flip-flop 501 now deenergized, the leading edge of the next clock pulse switches flip-flop 501 OFF and deenergizes output lead 307; and so on.

It can be readily seen from FIG. 5B that the frequency of the clock signals TRC1 and TRC2 is one-fourth the frequency of signal CK6S. Thus, signals TRC1 and TRC2 have a frequency of 1.544 megabits per second and have a period of 648 nanoseconds. As can be noted in FIG. 5B, signal TRC2 is delayed from signal TRC1 by ¼ pulse width or 162 nanoseconds.

With reference again to FIG. 3, output leads 307 and 308 of counter 306 are connected to the input of a translator network 309. In response to the X and Y states of leads 310 and 311 connected thereto, translator network 309 phase shifts signals TRC1 and TRC2 by 0, 162, 324 or 486 nanoseconds (0, one-fourth, one-half or three-fourths of a period). The output signal CK1TL on lead 104 is the output signal of sychronizing circuit 103 that is applied to select network 108 in FIG. 1. Signal CK2TL on output lead 313 of translator 309 is delayed one-fourth period (162 nanoseconds) from signal CK1TL. Translator network 309 is illustrated in FIGS. 6A, 6B and 6C. With reference to FIG. 6A, input leads 307 and 308 are connected to a gating network 601. Leads 310 and 311 are connected to a one-out-of-four decoder 602. Decoder 602 has four output leads 630–606 which are successively energized for each of the four combinations of states XY of leads 310 and 311. As each lead is successively energized, the delay between the output and input signals of translator 309 discretely varies in ¼ period steps. Accordingly, as will be noted hereinafter, when lead 603 is energized, indicated by state ADV0, the input and output signals are in phase. Similarly, when decoder 602 energizes lead 606, indicated by state ADV3, the output signals of translator are delayed by 486 nanoseconds. The chart in FIG. 6D indicates the relationship between the XY states of leads 310 and 311, and the output of decoder 602. Output leads 603–606 are connected to gating network 601. The outputs of gating network 601 are translator output leads 104 and 313.

Gating network 601 comprises the networks illustrated in FIGS. 6B and 6C. With reference to FIG. 6B, lead 307 is connected to a first input and lead 603 is connected to a second input of an AND gate 608. Lead 308 is connected to a first input and lead 604 is connected to a second input of an AND gate 609. Lead 307 is connected to a negate input and lead 605 is connected to a second input of an AND gate 610. Lead 308 is connected to a negate input and lead 606 is connected to a second input of AND gate 611. The outputs of AND gates 608–611 are connected to inputs of an OR gate 612. Signal CK1TL is present on the output lead 104 of OR gate 612. Inasmuch as only one output lead of decoder 602 is energized for each combination of states X and Y, only one AND gate 608–611 will gate a signal to OR gate 612. Signal CK1TL will thus be the signal appearing at the first input of the energized AND gate.

With reference to FIG. 6C, lead 308 is connected to a first input and lead 603 is connected to a second input of an AND gate 613. Lead 307 is connected to a negate input and lead 604 is connected to a second input of an AND gate 614. Lead 308 is connected to a negate input and lead 605 is connected to a second input of an AND gate 615. Lead 307 is connected to a first input and lead 606 is connected to a second input of an AND gate 616. The outputs of AND gates 613–616 are connected to inputs of an OR gate 617. Signal CK2TL is present on output lead 313 of OR gate 617. As discussed hereinabove, a signal will appear on the output of only one of the AND gates 613–616 and signal CK2TL is thus equal to the signal at the first input of the energized AND gate.

Figure 6E:
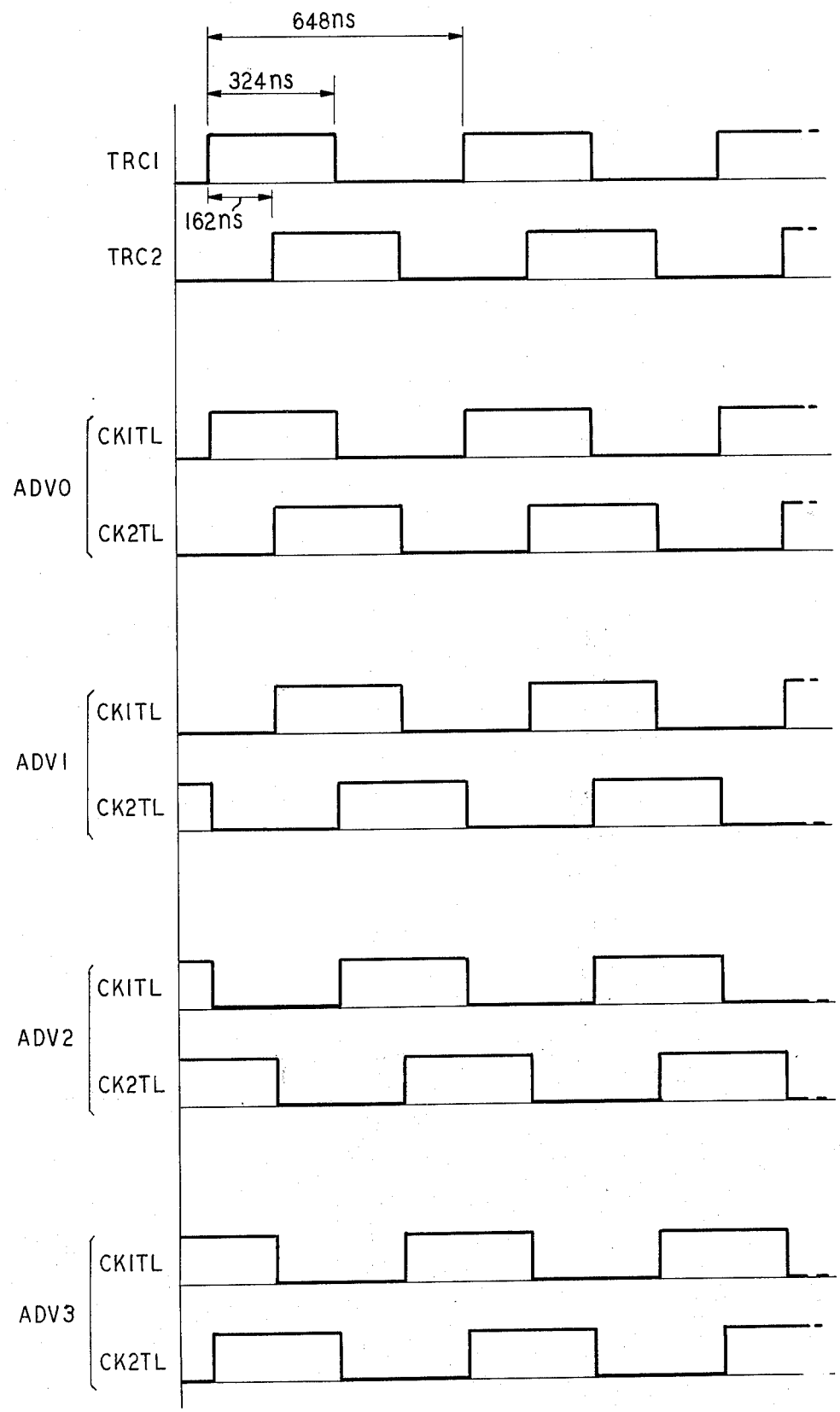
FIG. 6E illustrates the input and output timing diagrams of the circuitry of FIGS. 6A, 6B and 6C.

FIG. 6E illustrates all the output signals CK1TL and CK2TL of translator 309 for each output state of decoder 602. When lead 603 of the decoder 602 is energized (ADV0), signals CK1TL and CK2TL are in phase with the applied input signals TRC1 and TRC2, respectively. When lead 604 is energized (ADV1), signals CK1TL and CK2TL differ in phase from the applied signals TRC1 and TRC2 by 162 nanoseconds. Similarly, when lead 605 is energized (ADV2), signals CK1TL and CK2TL lag signals TRC1 and TRC2 by 324 nanoseconds or equivalently one-half period. When lead 605 is energized (ADV3), signals CK1TL and CK2TL lag signals TRC1 and TRC2 by 486 nanoseconds.

With reference again to FIG. 3, it can be observed that the phase of the 1.544 megabits per second clock signal outputted by synchronizing circuit 103 onto lead 104 is determined by both the phase of the 6.176 megabits per second signal selected by phase select network 301 and the translation effected by translator 309. Accordingly, as the W and Z states of leads 303 and 304 are varied in accordance with chart 4D, the phase of signal CK1TL is incremented in discrete steps of approximately 40 nanoseconds. Similarly, as the X and Y states of leads 310 and 311 are varied, the phase of signal CK1TL is shifted in discrete steps of 162 nanoseconds. Therefore signal CK1TL can be varied in both discrete fine steps of 40 nanoseconds and course steps of 162 nanoseconds. A sync control network having output leads 303, 304, 310 and 311 controls the XY and WZ states and thus the phase of the 1.544 megabits per second clock pulse signal CK1TL. As heretofore discussed, synchronization between the signal CK1TL and the 8 kilobits per second reference signal is effected when the pulse width of each reference pulse lies entirely within the time domain of the pulse width of a 1.544 megabits per second synchronizing signal derived from the 1.544 megabits per second clock pulse signals CK1TL and CK2TL. As heretofore discussed, the synchronizing signal is derived such that the pulse width is determined by the desired degree of synchronization and the pulse width of the reference pulses.

As is described in detail hereinbelow, a decoder network 315 connected by way of leads 313 and 104 to translator 309 derives a 1.544 megabits per second synchronizing signal STF lead 316 in which the pulse width of each derived pulse is 162 nanoseconds. Lead 16 is connected to a sync detector 317 to which is applied the 8 kilobits per second pulse stream PHF. A second 8 kilobits per second signal NPHF (for example, a slightly delayed version of PHF) is applied to sync detector 317 over lead 318 to reset sync detector 317 following each reference pulse. Output lead 319 of sync detector 317 is connected to a sync control network 305. As will be described hereinbelow, sync detector 317 compares the time domain of each reference pulse with synchronizing signal STF. If any portion of the PHF signal lies without the time domain of synchronizing signal STF, signal CK1TL is not properly phase synchronized and an ALM pulse is generated on lead 319. Sync control network 305 varies the X and Y states of leads 310 and 311 so as to translate the phase of signals CK1TL and CK2TL and thus also synchronizing signal STF by 162 nanoseconds. If the time domain of the next PHF pulse still does not lie within time domain of the phase-corrected STF pulse, an ALM pulse is again generated and sync control 305 effects an additional 162 nanosecond delay. If the time domain of the PHF signal does not entirely lie within the time domain of the STF signal at any of the four phase positions of translator 309, sycn control 305 effects a change of the W and Z states of leads 303 and 304 so as to vary the phase of signal CK6S by 40 nanoseconds and thus signals CK1TL and CK2TL. Nesting of PHF within the pulse width of STF is attempted at each of the four phase positions of translator 309 before the next φ signal is chosen by the phase select network 301. It can be shown that nesting and thus phase synchronization will always occur with at least one combination of W and Z, and X and Y states.

Figure 7A:
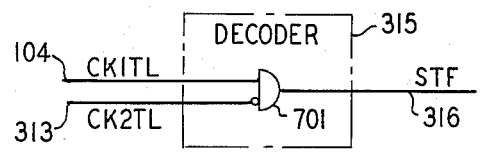
FIG. 7A illustrates an embodiment of a decoder employed in FIG. 3.
Figure 7:
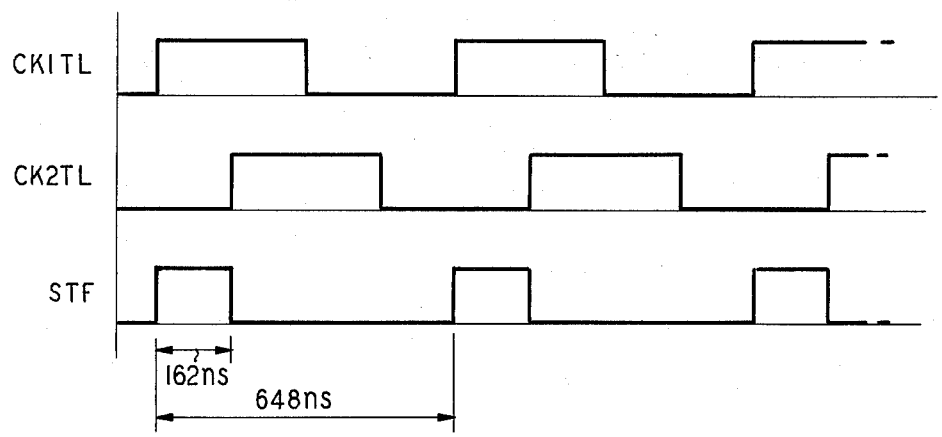
FIG. 7B is a timing diagram of the input and output signals of FIG. 7A.

Decoder network 315 is illustrated in FIG. 7A. As aforenoted, decoder 315 derives synchronizing signal STF on lead 316 having pulse widths determined by the desired phase tolerance between the active and standby clocks and the pulse width of the 8 kilobits per second reference pulse stream. As was described hereinabove in the discussion of FIG. 2, when the pulse width of the synchronizing signal is 162 nanoseconds and the reference pulse width is 61 nanoseconds, the active and standby clock streams will be synchronized within a maximum tolerance of 101 nanoseconds. As is readily apparent, if the STF pulses were narrower, the active and standby clocks could be phase synchronized within a narrower phase tolerance.

With reference to FIG. 7A, lead 104 is connected to a first input and lead 313 is connected to a negate input of AND gate 701. the output of AND gate 701 is lead 316. FIG. 7B illustrates the timing relationship between the input signals, CK1TL and CK2TL, and the output signal STF. As can be noted, lead 316 is energized only during that one-fourth period interval during which signal CK1TL is "1" and CK2TL is "0."Since signal CK2TL is delayed from signal CK1TL by ¼ pulse period, or equivalently 162 nanoseconds, the leading edge of signal STF is coincident with the leading edge of CK1TL and the trailing edge of STF is coincident with the leading edge of CK2TL. The frequency of synchronizing signal STF is thus equal to the frequency of signals CK1TL and CK2TL. The pulse width of synchronizing signal STF is however, 162 nanoseconds, equal to one-half the pulse width of signals CK1TL and CK2TL.

Figure 8A:
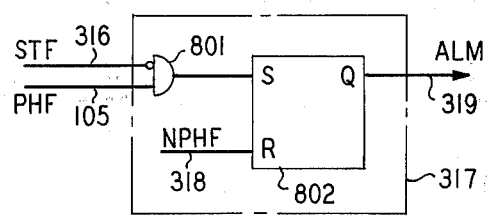
FIG. 8A illustrates a sync detector network used in FIG. 3.
Figure 8B:
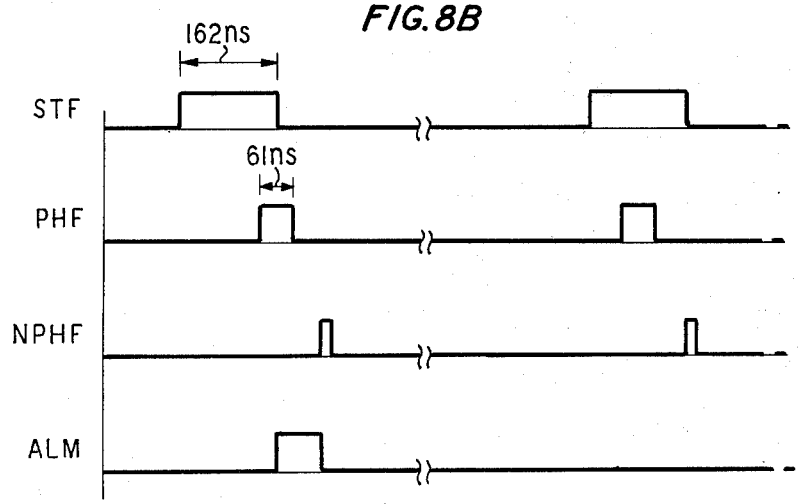
FIG. 8B is a timing diagram of the input and output signals of FIG. 8A.

Sync detector 317 is illustrated in FIG. 8A. The STF signal on lead 316 is applied to a negate input and the PHF signal on lead 105 is applied to a second input of an AND gate 801. The output of AND gate 801 is connected to the set input of a flip-flop 802. Signal NPHF is applied to the reset input of flip-flop 802 on lead 318. Signal NPHF has a frequency of 8 kilobits per second. The leading edge of each pulse in signal NPHF follows the trailing edge of each PHF reference pulse by a predetermined interval. Lead 319 is connected to the high Q output of flip-flop 802. The timing relationships between the input and output signals of sync detector 317 are illustrated in FIG. 8B. As can be noted from FIG. 8A, the output of AND gate 801 is energized only during those intervals in which lead 316 is deenergized and lead 105 is energized. The output of AND gate 801 is thus energized only during that part of the reference pulse PHF interval lying without the time domain of the synchronizing signal STF pulse interval. The energization of the output of AND gate 801 sets flip-flop 802 to produce an energized signal ALM on lead 319. The NPHF signal on lead 318, which as aforenoted follows each PHF pulse, resets flip-flop 802 to deenergize lead 319. As can be observed in FIG. 8B, therefore, an ALM pulse is produced during that portion of the PHF pulse which lies without the time interval of the STF pulse and has a trailing edge coincident with the leading edge of the NPHF pulse. Accordingly, an ALM pulse is produced in response to each PHF pulse which does not lie totally within the time interval of the derived STF pulses. Each ALM pulse, as will be described in detail hereinafter, effects a phase shift in the 1.544 megabits per second clock pulse stream and thus in the STF pulse stream. At the next PHF phase instant the time domain of the phase shifted STF signal and the PHF signal are again compared. As can be noted in FIG. 8B, if the PHF signal lies totally within the time domain of the STF pulse, the output of AND gate 801 remains deenergized and flip-flop 802 remains in the reset state. Accordingly, no ALM pulse is produced. As described hereinbelow, each ALM pulse effects one discrete change in the phase of the 1.544 megabits per second clock pulse stream CK1TL.

Figures 9A, 9B:
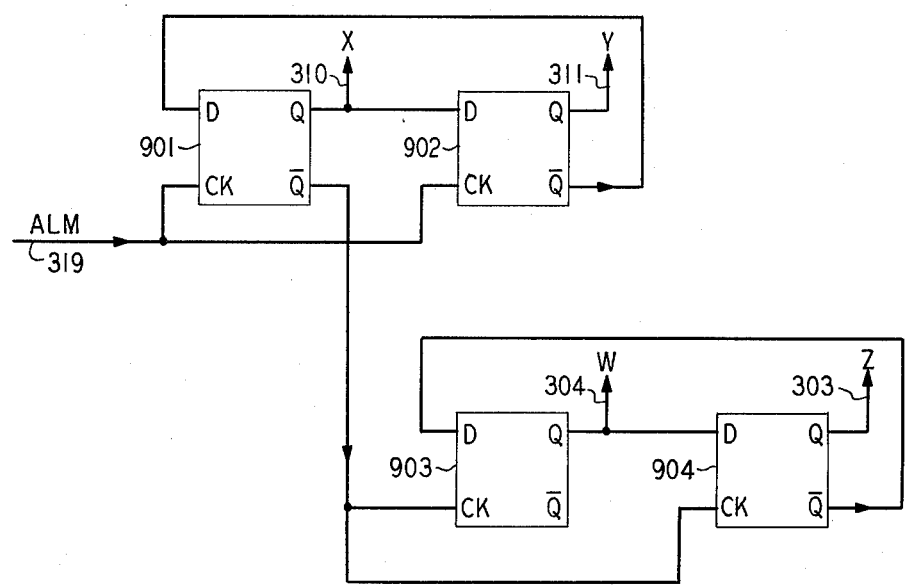
FIG. 9A illustrates a sync control network used in FIG. 3.
FIG. 9B is a logic table useful in explaining the operation of FIG. 9A.

Sync control network 305 is illustrated in FIG. 9A. Output lead 319 of sync detector 317 is connected to the clock inputs of positive edge triggered D-type flip-flops 901 and 902. The high Q output of flip-flop 901 is lead 310, which is also connected to the D input of flip-flop 902. The high Q output of flip-flop 902 is lead 311. The low Q̄ output of flip-flop 902 is connected to the D input of flip-flop 901. The low Q̄ output of flip-flop 901 is connected to the clock inputs of positive edge triggered D-type flip-flops 903 and 904. The high Q output of flip-flop 903 is lead 304 which is also connected to the D input of flip-flop 904. The high Q output of flip-flop 904 is lead 303. The low Q̄ output of flip-flop 904 is connected to the D input of flip-flop 903. Flip-flops 901, 902, 903 and 904 operate in a manner well known in the art. The state of each flip-flop is determined by the signal at its D input at the time instant of a leading edge of a state transition from 0 to 1 at the clock CK inputs. It can be readily seen therefore that flip-flops 903 and 904 will only change states at the time instant that flip-flop 901 is switching OFF since at that instant the Q̄ output of flip-flop 901 changes from a deenergized "0" state to an energized "1" state. It can be readily seen also that flip-flops 901 and 902 will cycle through four state changes before flip-flops 903 or 904 change state. FIG. 9B illustrates a chart representing the consecutive X, Y, W and Z states of leads 310, 311, 304 and 303, respectively. Upon the occurrence of each ALM pulse, generated when the time domain of the PHF pulse is without the time domain of the STF pulse and indicative of a loss of synchronization, the next consecutive XYWZ state combination is selected. Since, as aforenoted, the XY states control translator 309 and the WZ states control phase select network 301, each state change effects a phase variation in signals CK1TL and CK2TL. As heretofore discussed, each change in the XY states varies the phase of the 1.544 megabits per second signals CK1TL and CK2TL by a 162 nanosecond discrete step, while each change in the WZ states varies the phase of the clock signals by a 40 nanosecond discrete step. Once the phases of the signals CK1TL and CK2TL are adjusted such that each PHF pulse lies within the time domain of an STF pulse, W, Y, W and Z remain in their previously set states.

If the phase of the 1.544 megabits per second clock pulse stream varies during network operation due to component aging or other factors to such a degree that the reference clock pulse PHF does not lie entirely within the STF time domain, the ALM pulse is produced and a resynchronization is effected. Accordingly, with reference to FIG. 1, the active 1.544 megabits per second clock pulse signal on lead 104 remains phase locked to the 8 kilobits per second reference pulse stream on lead 105. The synchronizing circuit 106 is identical to synchronizing circuit 103 and the standby 1.544 megabits per second clock pulse stream generated on lead 107 is phase synchronized to the same 8 kilobits per second reference pulse stream on lead 105. As described in connection with FIG. 2, the active and standby 1.544 megabits per second clock pulse streams are thus phase synchronized to be within 101 nanoseconds of each other.

Various modifications of this invention can be made without departing from the spirit and scope of the present invention. For example, by adjusting the width of the synchronizing signal STF with reference to the PHF reference signal, a higher degree of phase synchronization can be obtained. Furthermore, phase select network 301 and translator 309 could be readily adapted to effect coarser and/or finer phase adjustments. In addition, individual phase adjustment networks could be replaced by one phase adjusting network responsive to sync control 305. The present invention is also not limited to discrete phase adjustments. That is, a continuously variable phase adjusting network can replace either or both the phase select network 301 and translator network 309.

The above-described arrangement is illustrative of the application and the principles of the invention. Other embodiments may be devised by those skilled in the art without departing from the spirit and scope thereof.

What is claimed is:

1. Apparatus for phase synchronizing a stream of clock pulses to a stream of reference pulses within a predetermined phase difference, the frequency of said clock pulses being a multiple of the frequency of said reference pulses, said apparatus being characterized by means for deriving from said stream of clock pulses a stream of synchronizing pulses having the frequency of said clock pulses, the pulse widths of said synchronizing pulses being of a duration greater than the pulse widths of said reference pulses by an amount determined by said predetermined phase difference, means for determining whether the pulse widths of said reference pulses are nested within the time domain of the pulse widths of said synchronizing pulses, and means responsive to the determining means for adjusting the phase of said stream of clock pulses until the pulse widths of said reference pulses are nested within the pulse widths of said synchronizing pulses.

2. Apparatus as defined in claim 1 wherein said means for adjusting the phase of said stream of clock pulses includes means for varying the phase of said stream of clock pulses in discrete incremental steps.

3. Apparatus as defined in claim 2 wherein said means for varying the phase of said clock pulse stream in discrete steps includes first means for varying the phase of the same in coarse phase steps, and second means for alternatively adjusting the phase of the clock pulse stream in fine phase steps.

4. Apparatus for phase synchronizing a stream of clock pulses to a stream of reference pulses within a predetermined phase difference, the frequency of said clock pulses being a multiple of the frequency of said reference pulses, said apparatus being characterized by means for receiving an input stream of pulses, the frequency of said input stream being another multiple of the frequency of said clock pulses, means for dividing the frequency of said input stream of pulses by said other multiple to generate said stream of clock pulses, means for deriving from said stream of clock pulses a stream of synchronizing pulses having the frequency of said clock pulses, the pulse widths of said synchronizing pulses being of a duration greater than the pulse widths of said reference pulses by an amount determined by said phase difference, means for determining whether the pulse widths of said reference pulses are nested within the time domain of the pulse widths of said synchronizing pulses, control means responsive to the determining means for generating a first control signal to control the phase of said input stream of pulses and a second control signal to control the phase of the stream of clock pulses from the dividing means, means responsive to said first control signal for varying the phase of said input stream of pulses, and means responsive to said second control signal for varying the phase of said stream of pulses from the dividing means, said first and second control signals being varied by said control means in a preselected manner until the pulse widths of said reference pulses are entirely nested within the pulse widths of said synchronizing pulses.

5. Apparatus as defined in claim 4 wherein said means responsive to said first control signal for varying the phase of said input stream of pulses includes delay means for delaying the input stream of pulses by a predetermined number of preselected delay intervals, decoding means responsive to said first control signal for selecting one of the preselected number of delayed streams of input pulses, an output terminal, and gating means responsive to said decoding means for gating to said output terminal the selected one of the preselected number of delayed streams of input pulses.

6. Apparatus as defined in claim 5 wherein said delay means includes a plurality of serially connected inverter means, each of said inverter means inverting and delaying the signal applied thereto.

7. Apparatus as defined in claim 4 wherein said means for deriving includes adding means having a first and second input, said stream of clock pulses being applied to said first input and a second stream of clock pulses being applied to said second input, said second stream of clock pulses being a delayed version of said stream of clock pulses with the delay therebetween serving to define the pulse widths of the synchronizing pulses.

8. Apparatus as defined in claim 4 wherein the determining means includes adding means for selectively adding said stream of synchronizing pulses with said stream of reference pulses, said adding means producing an energized output signal whenever any part of the pulse width of a reference pulse lies without the time domain of the pulse width of a synchronizing pulse.

9. Apparatus for phase synchronizing a first stream of clock pulses to a second stream of clock pulses within a predetermined tolerance by synchronizing said first and second streams of clock pulses to a stream of reference pulses, the frequency of said first stream of clock pulses being equal to the frequency of said second stream of clock pulses, the frequency of said streams of clock pulses being a multiple of the frequency of said reference pulses, said apparatus being characterized by first means for deriving from said first stream of clock pulses a first stream of synchronizing pulses having the frequency of said clock pulses, second means for deriving from said second stream of clock pulses a second stream of synchronizing pulses having the frequency of said clock pulses, the pulse widths of the synchronizing pulses in said first and second streams of synchronizing pulses being of a duration greater than the pulse widths of said reference pulses by an amount determined by said predetermined tolerance, first means for determining whether the pulse widths of said reference pulses are nested within the time domain of the pulse widths of said synchronizing pulses in said first stream of synchronizing pulses, first means responsive to the first determining means for adjusting the phase of said first stream of clock pulses until the pulse widths of said reference pulses are nested within the pulse widths of said synchronizing pulses in said first stream of synchronizing pulses, second means for determining whether the pulse widths of said reference pulses are nested within the time domain of the pulse widths of said synchronizing pulses in said second stream of synchronizing pulses, and second means responsive to the second determining means for adjusting the phase of said second stream of clock pulses until the pulse widths of said reference pulses are nested within the pulse widths of said synchronizing pulses in said second stream of synchronizing pulses.

* * * * *